United States Patent
Bell

[15] 3,685,393
[45] Aug. 22, 1972

[54] DEVICE FOR SMOOTHING IRREGULARITIES

[72] Inventor: Ramsay M. Bell, Schoolcraft, Mich.

[73] Assignee: Hammond Machinery Builders, Inc., Kalamazoo, Mich.

[22] Filed: April 15, 1970

[21] Appl. No.: 28,856

[52] U.S. Cl. .............................90/1.4, 90/14, 90/16, 90/17, 51/131, 51/287
[51] Int. Cl. .............................................B23f 19/10
[58] Field of Search............90/1.4, 14, 24.03, 20, 16, 90/1, 17; 51/131, 287, 248, 5

[56] References Cited

UNITED STATES PATENTS

| | | | |
|---|---|---|---|
| 2,207,433 | 7/1940 | Haswell | 51/131 X |
| 2,709,325 | 5/1955 | Green et al. | 51/248 |
| 3,494,254 | 2/1970 | Barfred | 90/14 |
| 3,130,642 | 3/1964 | Kulesh et al. | 51/287 X |

FOREIGN PATENTS OR APPLICATIONS 1,030,082  5/1966   Great Britain................90/1.4

*Primary Examiner*—Gil Weidenfeld
*Attorney*—Woodhams, Blanchard and Flynn

[57] ABSTRACT

A device for smoothing or removing irregularities, such as burrs, from a workpiece, such as a gear. A rotary cutting or skiving tool is first moved by an axially directed movement into contact with the surface on which a deburring operation is to be performed and is then moved in a cutting manner along, and relative to, said surface. The cutting tool is mounted for free rotation about its axis and said axis is adjustable to a position perpendicular to said surface. Preferably said cutter is mounted upon a post suitably supported in a fixed position relative to the machine. Suitable means are provided for effecting the axial and radial movement of the cutter as desired, and same may conveniently be driven by rotation of the workpiece against whose surface the cutter bears. One or more brushes may then be caused to operate against said surface to complete the deburring operation.

18 Claims, 7 Drawing Figures

INVENTOR
RAMSAY M. BELL

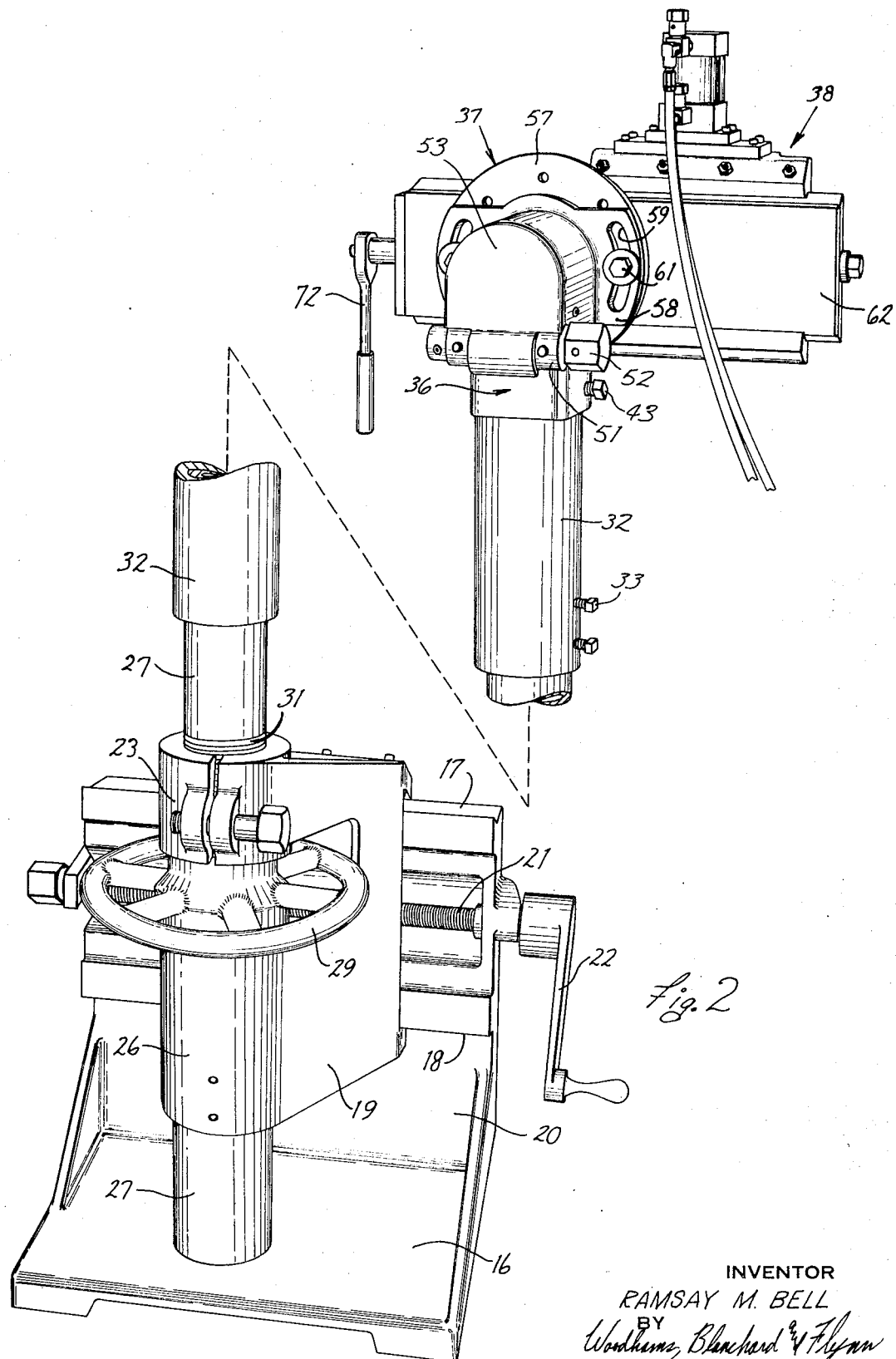

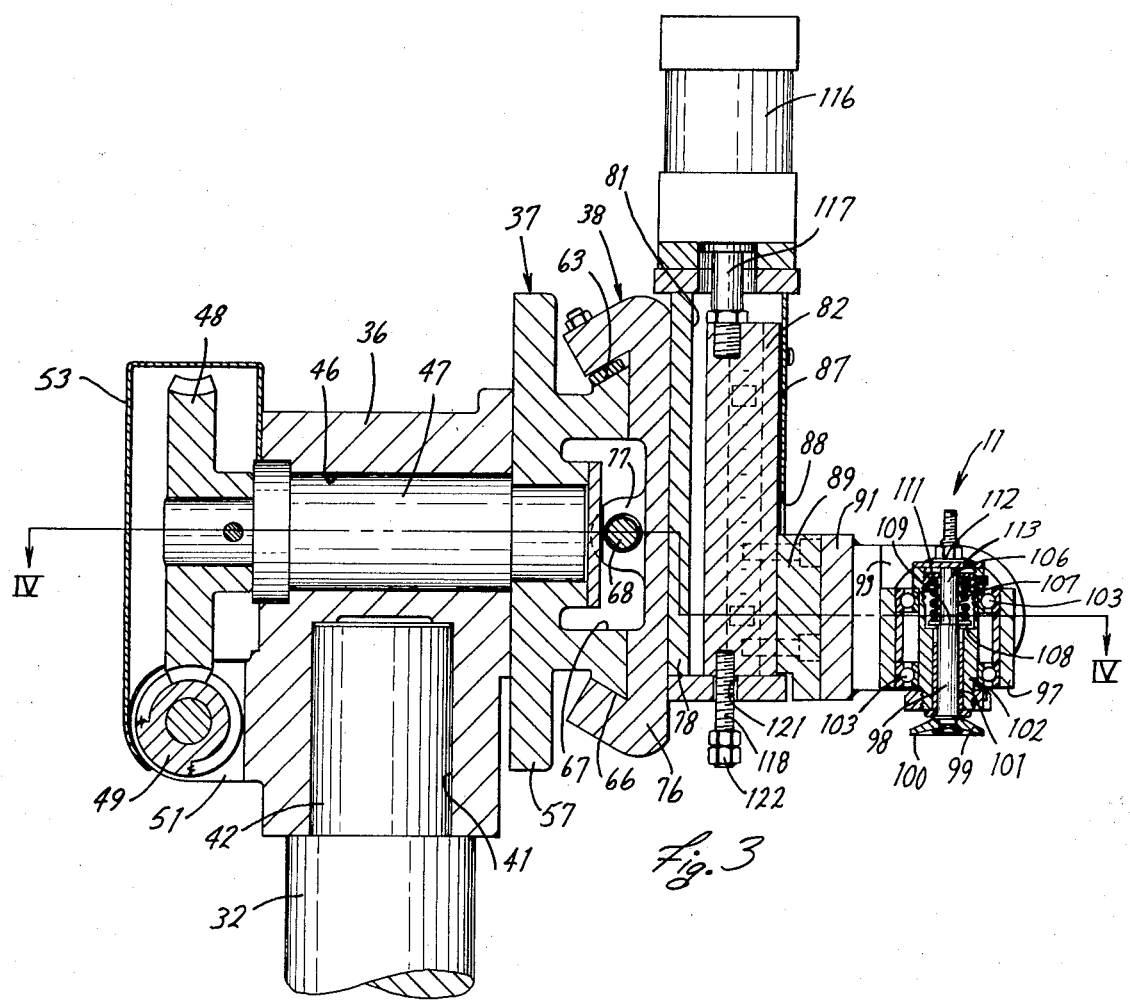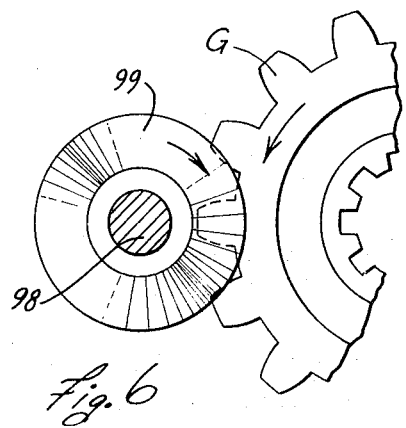

INVENTOR
RAMSAY M. BELL
BY
Woodhams, Blanchard & Flynn
ATTORNEYS

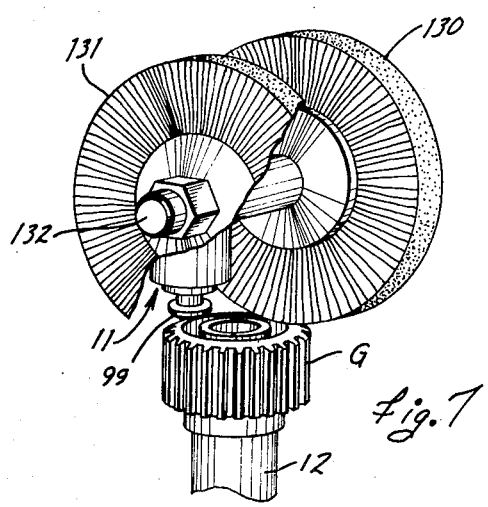

DEVICE FOR SMOOTHING IRREGULARITIES

FIELD OF THE INVENTION

This invention relates to a device for smoothing irregularities on a workpiece and, in particular, relates to a device for at least partially removing burrs from gears or similar workpieces. The device is particularly suitable for use with a rotatable support or spindle having a workpiece, such as a gear, mounted thereon with the gear being positioned so as to be engaged by the deburring device, the gear being rotated during the deburring operation to permit the deburring device to contact a complete peripheral area, such as the axial end face of the year.

BACKGROUND OF THE INVENTION

Gears are generally cut on hobbing or milling-type machines by a relative traversing movement of a tool in any of several well-known ways across the peripheral face of the gear so as to form the desired gear tooth. This type of gear cutting operation usually results in the formation of burrs or other projections adjacent one or both of the axial end faces of the gear. Since the presence of such burrs is usually unacceptable, newly formed gears are conventionally subjected to a brushing, scraping and/or filing operation to remove the burrs therefrom. Since most burrs are relatively small or light, such a brushing operation is effective without excessive inconvenience in removing the undesired burrs so that the gear will be in a form suitable for commercial use.

One manner in which the above-described brushing operation has been performed involves the use of an indexable rotatable table having a plurality of rotatable support shafts circumferentially positioned thereon, each shaft being adapted to have a newly formed gear positioned thereon, with the table being surrounded by a plurality of circumferentially spaced brushes. The table is sequentially indexed so as to position the newly formed gears directly adjacent a brush, whereupon the brush contacts the desired face of the gear for removing the burrs therefrom. During the actual brushing operation, the support shaft is rotated to cause the complete face of the gear to move under and come into contact with the brush. Each gear is sequentially moved between the adjacent brushes so that each of the several brushes performs a brushing operation on each gear in order to effectively remove the burrs therefrom.

While the above-described operation satisfactorily removes most burrs, particularly small or light burrs, such a brushing operation has been found undesirably time consuming and inefficient since complete removal of all burrs, especially heavy burrs, by the brushing operation often requires that the gear be acted upon by as many as four to six different brushes with each of the brushes performing separate and individual brushing operations on the gear. Subjecting each gear to such a large number of brushing operations is obviously not only undesirably time consuming and inefficient, but is also extremely costly in terms of brush wear and replacement.

Further, gears having large or heavy burrs thereon often must additionally be scraped and/or hand filed prior to brushing to reduce a large or heavy burr sufficiently to make brushing effective. The necessity of having to scrape or hand file the gears in addition to the brushing operation, obviously adds to the expense of the whole gear making operation.

A still further manner in which burrs are reduced prior to brushing involves placing the gear into contact with a grinding belt or a grinding wheel. While this operation is satisfactory for effecting acceptable results, nevertheless it has proven inefficient and undesirable since the grinding belts are subjected to fairly rapid wear, whereupon the grinding machine must be shut down to permit replacement of the grinding belts. This shutting down of the machine obviously introduces undesirable inefficiencies and disrupts the overall manufacturing process. Further, such grinding belts are relatively expensive, and often with a relatively short life, they result in a substantial increase in the cost of the overall gear manufacturing process.

A still further device intended to meet the objectives presently in mind involves a rotary disc shaped cutter, one embodiment of which is generally similar to a preferred embodiment of the cutter utilized by the present invention, such cutter is mounted for approach to the workpiece by a swinging motion through an arcuate path. This works effectively if the motion is such as to place the cutter on the workpiece in a precisely predetermined orientation with respect thereto but a slight misalignment will destroy its effectiveness. Since it is extremely difficult to control the mechanical parts moving through an arcuate path with such precision as to secure the desired orientation, this device has met with only limited acceptance.

Accordingly, it is an object of this invention to provide a device for at least partially removing irregularities from workpieces, particularly burrs from gears, which device will overcome the disadvantages described above.

It is another object of the present invention to provide a device, as aforesaid, particularly usable with a single spindle having a newly formed gear positioned thereon, with the device having a deburring cutter disposed for effectively and efficiently removing burrs from, or at least reducing burrs on, a selected face or surface of the gear.

It is a further object of the present invention to provide a device, as aforesaid, particularly suitable for use with a machine capable of mounting a plurality of newly formed gears thereon, such as an indexable rotary table, for assisting in efficient burr removal.

It is also an object of this invention to provide a device, as aforesaid, which permits partial or substantial removal of burrs by requiring only a single revolution of the gear relative to the deburring cutter so that the deburring cutter makes only a single pass over the surface of the gear.

Another object of the invention is to provide a device, as aforesaid, which can quickly and efficiently reduce large and heavy burrs prior to submission of the part to a conventional brushing operation.

A further object of the invention is to provide a device which utilizes a deburring cutter capable of at least partially removing burrs with the same effectiveness and efficiency as was formerly possible only by utilizing a large plurality of brushes, with the device removing at least a major portion of each burr so that the complete burr may generally be removed by subjecting the workpiece to only a single subsequent brushing operation.

Another object of the present invention is to provide a device which utilizes a deburring cutter which is substantially self-sharpening and thus can be utilized for long periods of time without requiring a shut down of the device.

It is also an object of this invention to provide a device which utilizes a deburring cutter which quickly and efficiently removes substantially all of the burrs, with the gear after having been acted upon by the deburring cutter having to be given a finishing operation requiring only one or two brushes, thereby resulting in an overall gear deburring operation which is substantially more economical than was true of conventional machines which utilized as many as six different brushes thereon.

Still a further object is to provide a device, as aforesaid, which permits the rapid and efficient removal of a major portion of the burrs from a selected surface of the gear with the device being simple in operation and relatively maintenance free, and further possessing sufficient adjustability so as to be adaptable and usable with various types and sizes of gear holding or mounting structures.

A further object of the invention is to provide a device as aforesaid which utilizes a disc shaped cutter and associates therewith mechanical feeding and actuating means having sufficient internal resiliency as to permit normal mechanical variations and tolerances without disturbing the desired orientation of such cutter with the workpiece surface upon which the deburring operation is being performed.

Other objects and purposes of this invention will be apparent to persons acquainted with devices of this general type upon reading the following specification and inspecting the accompanying drawings.

BRIEF DESCRIPTION OF THE DRAWINGS

FIG. 2 is a further isometric view of the device according to the present invention and illustrating the rearward side thereof.

FIG. 3 is a partial cross-sectional central elevational view as taken through the upper end of the upstanding post structure and through the sliding head mounted thereon.

FIG. 6 diagrammatically illustrates the work engaging relationship between the deburring tool and the gear.

FIG. 7 illustrates a modification.

Figure 1:
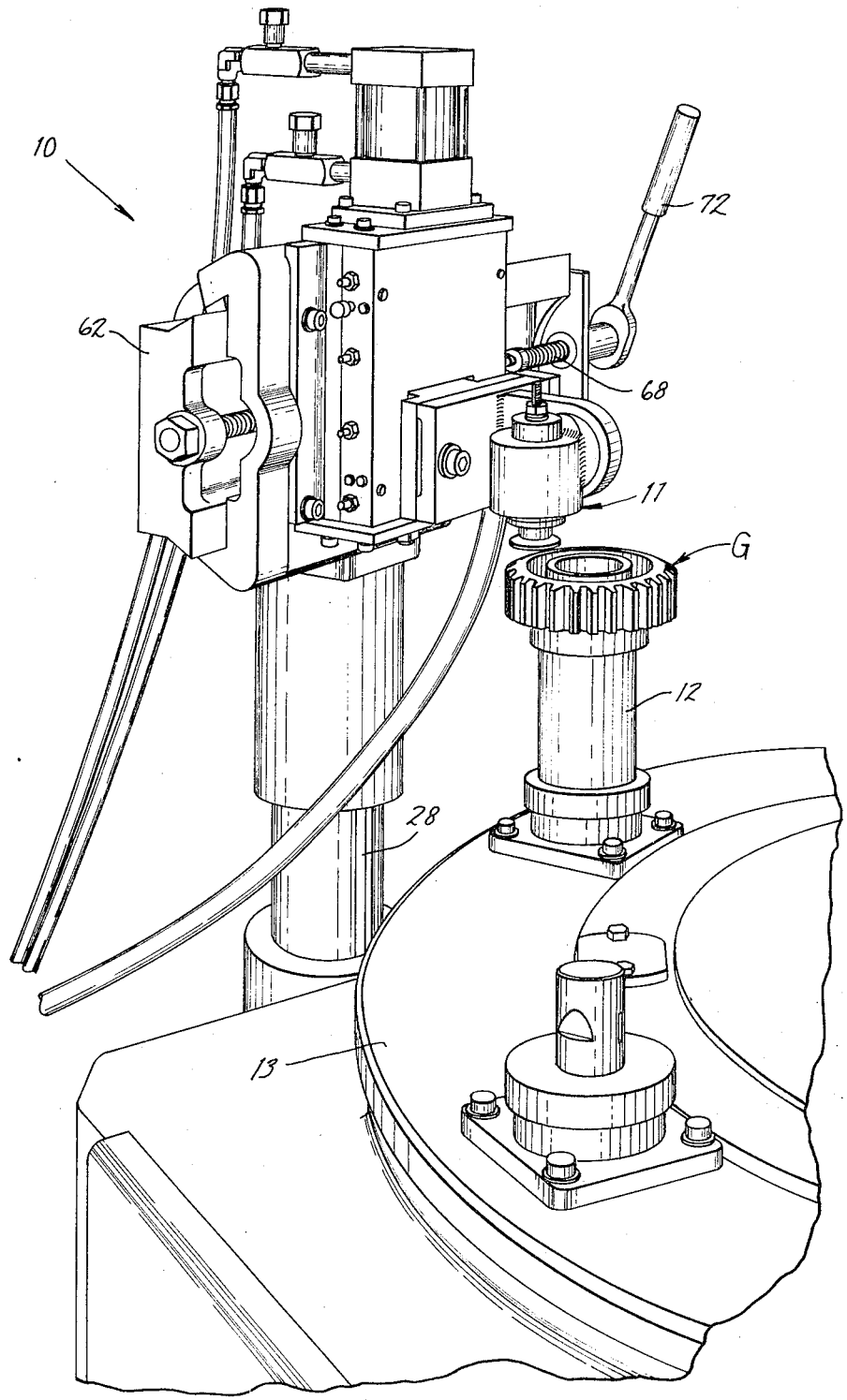
FIG. 1 is an isometric view of a device constructed in accordance with the present invention and illustrating its relationship with an indexable table having gears mounted thereon.

Certain terminology will be used in the following description for convenience in reference only and will not be limiting. The words "upwardly," "downwardly," "rightwardly" and "leftwardly" will designate directions in the drawings to which reference is made. The word "front" will refer to the forward side of the machine, that is the rightward side in FIG. 3. Similarly, the word "rear" will refer to the opposite side of the machine, namely the leftward side in FIG. 3. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the invention are met by providing a device capable of removing burrs and surface irregularities from workpieces, such as gears, which device includes a base having an extending post mounted thereon, which post is laterally selectively adjustable relative to the base. The post has a head mounted thereon adjacent its free end, the head being slideably mounted for permitting selected lateral displacement thereof relative to the longitudinal direction of the post. The head is also mounted for limited angular displacement relative to the post about an axis substantially perpendicular to said longitudinal direction. The head has a slideable block mounted thereon for sliding movement in a direction substantially transverse to the slideable direction of the head, the block being reciprocated by means of a power source, such as a fluid pressure cylinder. The block has a burr removing device mounted thereon, which device advantageously includes a freely rotatable burr removing tool or cutter adapted to move into engagement with a selected surface of a gear by means of the fluid pressure cylinder. This arrangement of cutter and mounting and feeding means permits the cutter to approach the work surface by a direct linear motion in a direction parallel to its own axis and permits the selection of such direction in a manner to orient it perpendicularly to the surface upon which work is to be performed. By introducing in any convenient manner some resilient backing between the cutter and the feeding means for same, a very stable device is achieved and one which can operate accurately and with a high degree of precision with respect to the workpiece. Rotation of the gear when the burr removing cutter is in engagement therewith causes a corresponding rotation of the cutter whereby the burrs are substantially removed from the gear as the gear undergoes a complete revolution.

DETAILED DESCRIPTION

FIG. 1 illustrates therein one effective apparatus 10 in which the present invention is embodied and by which it may be illustrated.

Such apparatus 10 includes a burr removing device 11 adapted to contact a gear G for removing burrs and irregularities therefrom, the gear G being nonrotatably mounted on the end of a rotatable stub shaft 12. The apparatus 10 is particularly applicable for use with a single spindle, such as the stub shaft 12, with the single spindle being rotatably mounted on a suitable stationary support. However, for purposes of illustration, the spindle or stub shaft 12 has been illustrated as being rotatably mounted on an indexable rotary table 13. Table 13 is preferably provided with a plurality of circumferentially spaced stub shafts 12 thereon, each of which is adapted to have a gear G mounted thereon for permitting the gears to be sequentially positioned adjacent the burr removing device 11 for engagement therewith. Provision of the table 13 having a plurality of stub shafts 12 thereon thus permits a more efficient and rapid utilization of the apparatus 10 then is possible when only a single gear supporting spindle is provided.

The apparatus 10 is illustrated in greater detail in FIG. 2 and includes a stationary base 16 having an upstanding flange 20 with a pair of substantially parallel, horizontally extending guideways 17 and 18 being formed thereon. A yoke member 19 surrounds and is slideably supported on the guideways 17 and 18. The yoke member 19 is also in threaded engagement with a screw 21, which screw 21 is rotatably supported on the base 16 and is selectively rotated by any convenient means, such as a crank 22. Rotation of crank 22 and of screw 21 causes the yoke 19 to be slideably moved horizontally along the guideways 17 and 18.

The yoke member 19 includes upper and lower cylindrical hub portions 23 and 26, respectively, through which extends a lower post 27. POst 27 includes a keyway 28 (FIG. 1) extending longitudinally thereof, which keyway receives therein a key (not shown) fixedly secured to the yoke member. The keyway 28 and its associated key prevents rotation of the post 27 while permitting same to freely axially slide relative to the upper and lower hub portions 23 and 26.

The lower post 27 is further provided with an intermediate threaded portion 31, which portion 31 is in threaded engagement with internal threads formed on the rotatable hand wheel 29, which hand wheel 29 is rotatably supported on and between the cylindrical hub portions 23 and 26. Rotation of the hand wheel 29 causes a corresponding axial movement of the lower post 27 due to the threaded engagement therebetween, the hand wheel 29 being prevented from moving axially by being axially confined between the upper and lower hub portions 23 and 26, respectively.

The upper end of the lower post 27 is telescopically received within the lower end of an upper post 32, the upper and lower posts 32 and 27, respectively, being fixedly secured relative to one another by means of suitable locking means, such as locking screws 33. The telescopic arrangement of the posts 27 and 32 permits the axial length of the post structure, that is the vertical height thereof, to be selectively adjusted.

The upper end of the post 32 has support means mounted thereon, which support means includes a housing member 36 and a rotatable flange 37 positioned adjacent the front face of the housing member 36. The rotatable flange 37 in turn supports a slideable head 38, which head 38 is described in greater detail hereinafter.

As illustrated in FIG. 3, the housing member 36 is provided with a bore 41 into which extends the reduced end 42 of the upper post 32, the housing member 36 and reduced shaft end 42 being nonrotatably interconnected by any suitable means, such as a set screw 43 (FIG. 2). The housing 36 is provided with a further substantially horizontal bore 46 therein, in which is rotatably positioned a shaft 47. Shaft 47 is provided with a worm gear 48 nonrotatably secured to the rearward end thereof, which worm gear is in meshing engagement with a conventional worm 49. Worm 49 is rotatably supported within a pair of ears 51 which are fixedly, here integrally, secured to the housing member 36. The worm 49 is preferably provided with a suitable driving means, such as an enlarged hexagonal head 52 (FIG. 2), for permitting same to be engaged by a conventional hexagonal wrench for causing selective rotation of the worm 49. The worm gear 48 and worm 49 are suitably enclosed by a cover 53.

Figure 4:
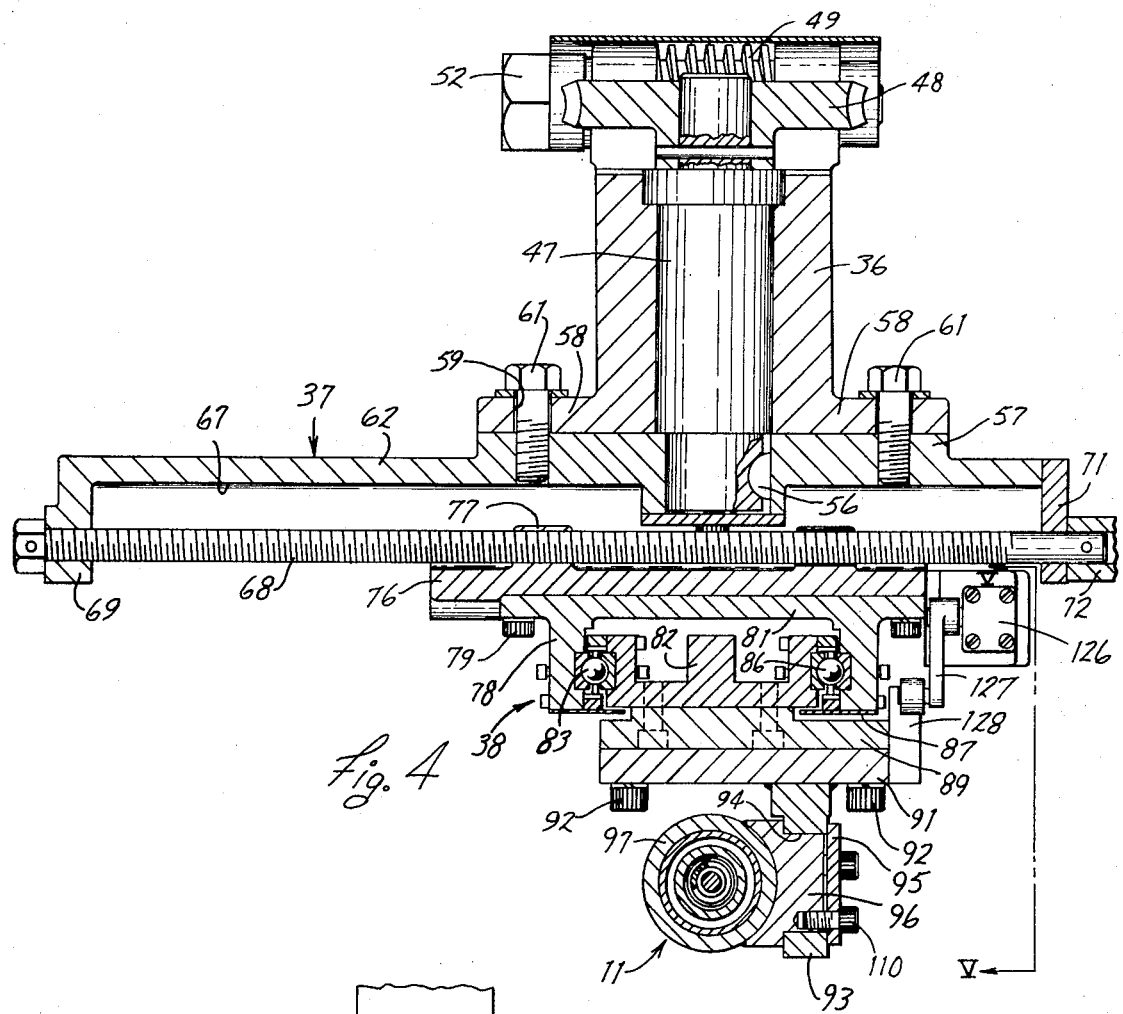
FIG. 4 is a sectional view as taken along the line IV—IV of FIG. 3.

The shaft 47 is further provided with a reduced forward end portion which is nonrotatably secured, is by a key 56 (FIG. 4), to the rotatable flange 37. The rotatable flange 37 includes an annular plate-like portion 57 which is positioned adjacent to and in bearing engagement with a pair of laterally extending flanges 58 which are fixedly secured to and extend outwardly from the housing member 36. The flanges 58 are each provided with an arcuate slot 59 therein, through which extends a screw 61, which screw is in threaded engagement with the rotatable flange 57. Loosening of the screws 61 and the provision of the arcuate slots 59 permits the flange 37 to be angularly rotated a limited amount relative to the housing member 36 due to rotation of the worm 49 and a corresponding rotation of the worm gear 48 and shaft 47. When the flange 37 has been angularly moved about the horizontal axis of the shaft 47 into the desired position, then the screws 61 are tightened so as to fixedly interconnect the rotatable flange 37 and the housing member 36.

The rotatable flange 37 further includes an elongated guide plate 62 fixedly secured, here integrally, to the annular plate-like portion 57. The guide plate 62 includes parallel upper and lower dovetail guideways 63 and 66, respectively, which extend substantially in the horizontal direction, being slightly angularly displaceable from the horizontal position due to the permissible angular adjustment of the rotatable flange 37 relative to housing 36.

The guide plate 62 includes an elongated central recess 67 therein, in which is positioned a threaded screw member 68. The screw member 68 extends between and is rotatably supported on a pair of end flanges 69 and 71, which end flanges are fixedly secured to the elongated guide plate 62. The one end of the screw member 68 is provided with a crank 72 secured thereto for permitting selective rotation of the screw member 68.

The elongated guide plate 62 is partially surrounded by and supports thereon a channel-shaped head or slide 76, which head 76 is slideably supported on and slideable along the guideways 63 and 66. The head 76 has a pair of rearwardly extending ears 77 fixedly, here integrally, secured thereto, which ears are in threaded engagement with the screw 68 whereby rotation of screw 68 causes a corresponding sliding movement of the head 76 along the guideways 63 and 66.

The channel-shaped head 76 has a hollow housing member 78 fixedly secured thereto, as by screws 79. The housing member 78 has an elongated opening 81 therein in which is positioned a slide block 82, the slide block being supported on the housing 78 by a pair of ballways 83 and 86, which ballways permit the slide block 82 to slideably move in a direction substantially transverse to the elongated direction of the guideways 63 and 66.

The hollow housing member 78 is substantially closed by means of a platelike cover 87 which is fixedly secured to the front face of the housing member 78, the cover 87 being provided with a suitable opening 88 in the lower portion thereof. An adapter plate 89 is fixedly secured to the slide block 82 and extends forwardly therefrom through the opening 88 provided in the cover 87. The adapter plate 89 is provided so as to permit the burr removing device 11 to be fixedly interconnected to and movable with the slide block 82.

To permit mounting of the burr removal device 11 on the adapter plate 89, there is provided a mounting plate 91 which is fixedly securable to the adapter plate 89 by any conventional means, such as screws 92. A bracket 93 is fixedly secured to and extends outwardly from the mounting plate 91, the bracket being provided with a suitable circular opening 94 extending therethrough. A stub shaft 96 is positioned within and extends outwardly from the opening 94, the stub shaft being selectively rotatable into a desired angular position relative to the bracket 93. The stub shaft 96 is fixedly securable relative to the bracket by means of a cover 95, which cover is suitably tightened into engagement with the bracket by means of screws 110. Stub shaft 96 is fixedly secured, as by welding, to an outer tubular housing member 97 of the burr removal device 11, the tubular housing member 97 extending substantially transversely relative to the axis of the opening 94.

The burr removal device 11 (FIG. 3) includes a spindle 98 which is freely rotatably mounted within the housing member 97, the spindle 98 being provided with a wheellike deburring or shearing tool or cutter 99 on the lower end thereof. The spindle 98 is positioned within a bushing 101, which in turn is supported by a mounting sleeve 102 which is freely rotatably supported within the tubular housing member 97 by a pair of axially spaced bearing assemblies 103. The spindle 98 is provided with a reduced upper shaft portion 106 which is surrounded by a compression spring 107. The lower end of compression spring 107 bears against a washer 108, which in turn seats against the shoulder 109 formed on the spindle 98. The upper end of the compression spring 107 bears against an abutment member 111 which is fixedly secured, as by a threaded engagement, to the mounting sleeve 102. Spring 107 thus resiliently urges the spindle 98 in a downward direction. The downward movement of the spindle 98 is limited by means of a nut 112 which is provided on the threaded upper end of the spindle 98, which nut is adapted to contact a stationary top plate 113 for limiting downward spindle movement.

To permit the cutter 99 to move downwardly into engagement with a selected surface of the gear G, such as into engagement with the axial end face of the gear, there is provided a power means, such as a fluid pressure cylinder 116, which cylinder has its piston rod 117 fixedly connected, here threadedly, to the slide block 82 for controlling the reciprocating movement thereof. The slideblock 82 is further preferably provided with a threaded stud 118 extending from its lower end, which threaded stud extends through an opening 121 formed in the housing member 78. Threaded stud 118 is provided with suitable nuts 122 on the lower end thereof, which nuts function as adjustable stops for limiting the upward movement of the guide block 82.

Figure 5:
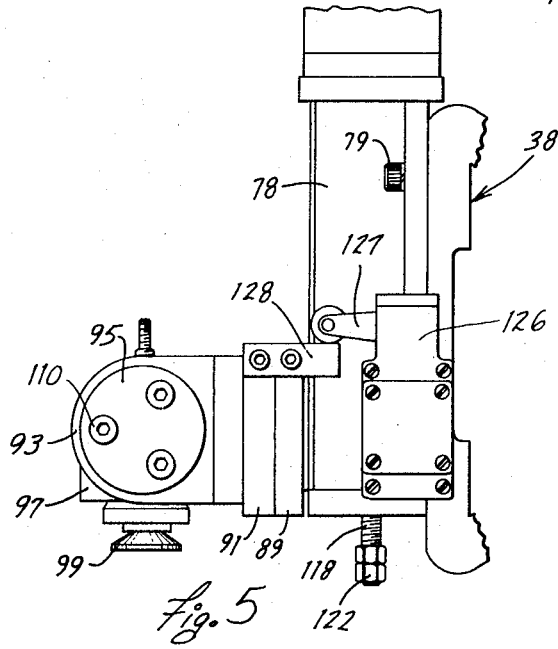
FIG. 5 is a partial side elevational view as taken along the line V—V of FIG. 4.

The housing member 78 is further provided with a limit switch 126 (FIG. 5) mounted thereon, which limit switch has a switch lever 127 which is adapted to be contacted by an extension 128 fixedly secured to either or both the adapter plate 89 and mounting plate 91.

Limit switch 126 is normally open switch for preventing energization of the drive means for the table 13. The switch lever 127 of switch 126 is contacted by extension 128 so as to close the switch whenever the piston rod 117 of fluid pressure cylinder 116 is in its uppermost position, thereby permitting rotatable indexing movement of the table 13. When fluid pressure cylinder 116 is energized to move slide block 82 and cutter 99 downwardly, extension 128 moves away from lever 127 whereby limit switch 126 opens and prevents any rotary movement of table 13 when cutter 99 is moved into contact with a gear G.

OPERATION

The operation of the device embodying the invention will be described in detail hereinbelow for a better understanding thereof.

In utilizing the apparatus 10 according to the invention, same is positioned closely adjacent a workpiece supporting device, such as a single rotatable spindle or a rotatable table 13 having a plurality of rotatable spindles thereon. When the table 13 is utilized, each spindle or stub shaft 12 will have a workpiece or gear G nonrotatably connected thereto. Table 13 will be indexed to a position such that one of the gears G will be positioned directly under the deburring cutter 99. Fluid cylinder 116 will then be energized to cause the slide block 82 and bracket 93 to move downwardly toward a selected surface of the gear G which, in the illustrated embodiment, is the upper axial end face of the gear, the downward movement continuing until the cutter 99 contacts the selected surface of the gear G. The slide block 82 is preferably moved downwardly for a small distance after the cutter 99 initially contacts the selected surface of the gear G so as to cause a partial compression of the spring 107, which spring will thus resiliently urge the face 100 of the cutter 99 into snug bearing engagement with the selected gear surface. In this manner some mechanical variation in the feeding means can be permitted to exist without greatly altering the pressure by which the cutter bears against the selected gear surface. In other words, a positive contact between the cutter and the surface is obtained but the pressure therebetween is limited to a value below that at which excessive driving friction, scratching or gouging would occur.

The rotational axis of the spindle 98 is selected and held as closely as possible in a perpendicular orientation with respect to the selected gear surface being sheared and, when the selected surface comprises an axial end face as in the illustrated embodiment, the rotational axis of the spindle 98 is substantially parallel to but laterally offset from the rotational axis of the gear G (as illustrated in FIG. 6) so that the cutter 99 will contact the outer peripheral portion of the axial end face of the gear.

In this manner the cutter is caused to move through a rectilinear path in a precisely controllable orientation with respect to the surface of the workpiece upon which a deburring operation is being performed to ensure that such path is preferably, and in most cases necessarily, as nearly perpendicular as possible to such surface. Resilient backing for said tool insures that despite whatever mechanical irregularities there may be in the feeding mechanism it will lie snugly against said surface and thereby cut said burrs in a plane substantially coplanar with said surface.

When the deburring cutter 99 is positioned in bearing engagement with the gear as illustrated in FIG. 6, the stub shaft 12 is rotated to cause a corresponding rotation of gear G, which rotation causes the complete peripheral portion of the axial end face of the gear to pass under the cutter 99 so as to cause removal of at least a major portion of the burrs as the gear undergoes one complete revolution. Further, since the cutter 99 is mounted for free rotation relative to its tubular housing 97, the rotation of the gear G and its frictional engagement with the cutter 99 also causes a corresponding rotation of the cutter 99, which thus results in a longer life and a more uniform wear thereof. The rotation of the deburring cutter 99 thus results in same substantially functioning in the manner of a conventional cutting tool so that same can effectively cut or shear off large or heavy burrs which are integrally attached to the gears. The cutter 99 also is substantially self-sharpening when operated in the above manner since substantially all wear on the cutter comprises a wearing away of the front face 100. However, since the rear face of the cutter is tapered, any wearing away of the front face 100 still results in a formation of a sharp tapered cutting edge.

After the gear has undergone a complete revolution so as to substantially remove the burrs therefrom, power cylinder 16 is energized in a reverse direction to move the cutter 99 upwardly out of engagement with the gear, whereupon the table 13 is then rotatably stepped to position the next succeeding gear in position to be contacted by the deburring cutter 99 and the cycle is repeated.

The apparatus according to the present invention thus efficiently and quickly permits at least partial removal of burrs, even large and heavy burrs, from a workpiece, such as a gear. The apparatus is also highly desirable since it possesses numerous adjustments which permit it to be adjusted into substantially any desired position so as to accommodate various types, shapes and sizes of workpieces and in addition is able to accommodate various types of apparatuses and machines upon which the workpiece or gears are mounted. For example, the post assembly 27, 32 can be moved laterally relative to the base 16 by causing rotation of the crank 22. Similarly, the post assembly can be raised or lowered by rotating the hand crank 29. In a similar manner the slideable head 38 carrying the deburring device 11 can be angularly adjusted about a horizontal axis, as defined by the shaft 47, by rotating the worm 49. This angular adjustment of the head permits the deburring cutter 99 to be angularly inclined to contact a chamfer or tapered surface formed on a gear or other workpiece. A further lateral adjustment is accomplished by sliding the head 38 laterally, that is, substantially in a horizontal direction, along the rotatable flange 37 by rotating the screw 68 by the crank 72. A still further angular adjustment of the deburring cutter 99 is possible due to the permissible positioning of the stub shaft 96 in any desired angular orientation, which adjustment permits the deburring cutter 99 to be substantially angularly displaced within a substantially vertical plane which contains the axis of the rotatable shaft 47.

While the apparatus 10 embodying the present invention has been disclosed as having a vertically extending, upright post 27, the post 27 could obviously extend outwardly from the base in any selected direction or angular orientation, thereby enabling the head and the deburring device 11 mounted thereon to be oriented so as to be engageable with many different types of workpiece supporting devices.

While in the foregoing embodiment it is assumed that the cutter is at one work location and the brushes are placed at other and subsequent work locations, those skilled in the art will recognize that the broader concept of the invention, namely, the rectilinear and perpendicular orientation and resilient feeding of the cutter to the workpiece surface upon which a deburring operation is to be performed, may be applied by a number of other specific mechanisms. Particularly, as illustrated in FIG. 7 one desirable form thereof places one or preferably two brushes 130 and 131 cooperating coaxially in the same rotative direction as, but not necessarily by, placing same in spaced relationship on a single shaft 132, with said brushes operating at diametrically opposite sides of the workpiece G and the cutter 99 being positioned for operation on the same workpiece, such as a gear, at a point adjacent the circumference thereof and circumferentially between said brushes. However, even with this embodiment the basic and broader concept of the invention still applies, namely the feeding of the cutter through a rectilinear path along a line perpendicular to the surface upon which the work is being performed and feeding same by resilient backed means to ensure that the cutter lies snugly against said surface.

Although particular preferred embodiments of the invention have been disclosed above for illustrative purposes, it will be understood that still other embodiments or modifications thereof which lie within the scope of the invention are fully contemplated.

The embodiments of the invention in which I claim an exclusive property or privilege are defined as follows:

1. A device for at least partially removing or reducing burrs and chips from a workpiece, such as a gear, comprising:

base means including extending support means;

head means mounted on said support means;

adjustment means coacting between said support means and said head means for permitting the position of said head means to be selectively varied relative to said support means;

slide means mounted on said head means for slideable movement relative thereto along a rectilinear path into contact with a selected surface of said workpiece;

said adjustment means including a pair of substantially parallel guideways on and extending substantially transverse to the longitudinally extending direction of said support means, said head means comprising a head member supported on and slideably disposed on said guideways, and said slide means being mounted on said head means for slideable movement in a direction substantially transverse to the extending direction of said guideways;

power means connected to said slide means for causing slideable movement of said slide means relative to said head means between operative and inoperative positions;

a deburring device fixedly connected to said slide means for movement therewith, said deburring device including a housing fixedly interconnected to said slide means and a circular deburring tool rotatably supported on said housing, said deburring tool when in said operative position being disposed in engagement with the selected surface of said workpiece for permitting removal of burrs therefrom, said deburring tool when in said inoperative position being spaced from and out of engagement with said workpiece; and means associated with the deburring device for limiting the pressure with which said tool is caused to bear against the selected surface of said workpiece when said deburring device is moved to said operative position by said power means.

2. A device according to claim 1, wherein said adjustment means includes angular adjustment means for permitting at least limited angular displacement of said head means relative to said support means about an axis substantially perpendicular to the longitudinally extending direction of said support means, said angular adjustment means also including lock means for permitting said head means to be fixedly secured in a selected angular position.

3. A device for at least partially removing or reducing burrs and chips from a workpiece, such as a gear, comprising:

base means including extending support means, said support means including substantially vertical post means extending upwardly from said base means and a support member fixedly secured to said post means adjacent the upper end thereof;

an angularly displaceable mounting plate rotatably supported on said support member;

head means mounted on said mounting plate;

adjustment means coacting between said support means and said head means for permitting the position of said head means to be selectively varied relative to said support means;

said adjustment means coacting with said mounting plate for permitting selected angular displacement thereof relative to said support member and for permitting said mounting plate to be fixedly secured relative to said support member in a selected angular position;

said adjustment means also including cooperating guide means between said head means and said mounting plate for permitting linear movement of said head means relative to said mounting plate;

slide means mounted on said head means for slideable movement relative thereto along a rectilinear path into contact with a selected surface of said workpiece;

power means connected to said slide means for causing slideable movement of said slide means relative to said head means between operative and inoperative positions;

a deburring device fixedly connected to said slide means for movement therewith, said deburring device including a housing fixedly interconnected to said slide means and a circular deburring tool rotatably supported on said housing, said deburring tool when in said operative position being disposed in engagement with the selected surface of said workpiece for permitting removal of burrs therefrom, said deburring tool when in said inoperative position being spaced from and out of engagement with said workpiece; and means associated with the deburring device for limiting the pressure with which said tool is caused to bear against the selected surface of said workpiece when said deburring device is moved to said operative position by said power means.

4. A device according to claim 3, wherein said adjustment means includes screw means connected between and coacting with said head means and said mounting plate for permitting linear movement of said head means relative to said mounting plate along said guide means.

5. A device according to claim 4, wherein said adjustment means includes gear means drivingly interconnected to said mounting plate for causing angular displacement thereof, said gear means including a self-locking worm and worm gear arrangement.

6. A device according to claim 5, wherein said head means includes a substantially channel-shaped member having a pair of spaced guide surfaces formed thereon, said mounting plate having similar guide surfaces disposed in slideable bearing engagement with the guide surfaces of said channel-shaped head member, and said slide means including a slide block mounted on said head member for slideable movement in a direction substantially transverse of the direction of linear movement of said head member relative to said mounting plate.

7. In combination with a gear supporting apparatus mounted for rotation between a plurality of working stations angularly spaced about a primary axis and having at least a pair of gear support devices mounted for rotation about secondary axes which are radially spaced from said primary axis, said gear supporting devices each being adapted to have a gear nonrotatably mounted thereon, a burr removing device positioned adjacent said gear supporting apparatus at one of said working stations and disposed for coacting with the gear associated with one of the gear supporting devices located at said one station for substantially removing burrs or chips from the gear, said burr removing device comprising:

base means including extending support means;

head means movably mounted on said support means adjacent the free end thereof and adjustment means for permitting the position of said head means to be selectively varied relative to said base means;

slide means mounted on said head means for slideable movement relative thereto, said slide means including a reciprocal slide member linearly movable in a direction substantially toward and away from said one gear supporting device;

power drive means connected to said slide means for causing slideable movement of said slide member in said direction; and deburring means fixedly connected to said slide member for movement therewith, said deburring means including a housing fixedly interconnected to said slide member and an annular deburring tool rotatably supported on said housing, said deburring tool being normally spaced from said gear supporting means whereby energization of said power drive means causes said slide member and said deburring tool to be moved toward and into contact with the gear disposed on the gear supporting means for causing substantial removal of burrs from the gear;

said deburring means including a spindle positioned within said housing and means mounting said spindle for free rotation relative to said housing, said deburring tool comprising an annular cutter fixedly secured to said spindle, and spring means disposed within said housing and coacting between said spindle and said housing for normally urging said cutter in a direction toward the gear supporting device and for limiting the contact pressure between said cutter and said gear.

8. The combination according to claim 7, wherein the gear supporting apparatus includes an indexable rotary table having a plurality of circumferentially spaced spindles thereon, each of said spindles being rotatably mounted on said table and being adapted to have a gear nonrotatably mounted adjacent the free end thereof.

9. A device for at least partially removing burrs from a workpiece, such as a newly formed gear, comprising:
means for supporting said workpiece firmly in a predetermined position;
a disk-shaped cutter having a peripheral cutting edge thereon;
means for supporting and feeding said cutter along a rectilinear path into contact with a selected surface of said workpiece, including means for orienting said path to a position substantially perpendicular to said surface;
means effecting relative movement between the peripheral edge of said cutter and said workpiece whereby said burrs are effectively sliced from said workpiece; and
wire brush means positioned for acting on said surface of said workpiece immediately following the deburring operation performed by the cutter, said brush means including a pair of spaced brushes positioned for simultaneous engagement with said surface at a pair of spaced locations; and
means rotatably supporting and driving said brush means.

10. The device defined in claim 9, wherein said means rotatably supporting and driving said brush means comprises a single shaft connected to both of said brushes for simultaneously rotating same.

11. The device defined in claim 9, wherein said pair of brushes are substantially coaxially aligned and are axially spaced apart by a distance sufficient to permit both of said brushes to simultaneously contact the same workpiece at spaced locations thereon, and said cutter being positioned to engage the workpiece at a location which is spaced radially of the rotational axis of said brushes but is located axially between said pair of spaced brushes.

12. The device according to claim 11, wherein said pair of brushes contact said workpiece at diametrically opposite sides thereof, and said cutter contacts said workpiece at a point adjacent the circumference thereof but circumferentially spaced between the locations where said workpiece is contacted by said pair of brushes.

13. A device for at least partially removing or reducing burrs and chips from a workpiece, such as a gear, comprising:
base means including extending support means, said support means comprising substantially upwardly extending post means connected to said base means and having a support member fixedly secured thereto substantially adjacent the upper end thereof;
head means mounted on said support means, said head means being mounted on said support member for permitting limited relative movement therebetween;
adjustment means coacting between said support means and said head means for permitting the position of said head means to be selectively varied relative to said support means, said adjustment means coacting between said support member and said head means for permitting the position of said head means relative to said support means to be selectively varied within a vertical plane;
slide means mounted on said head means for slideable movement relative thereto along a rectilinear path into contact with a selected surface of said workpiece, said slide means being mounted on said head means for slideable movement substantially within a vertical direction between operative and inoperative positions;
power means connected to said slide means for causing slideable movement of said slide means relative to said head means between said operative and inoperative positions, said power means comprising a fluid pressure cylinder having a linearly moveable drive member connected to said slide means for moving same, said slide means being moved substantially vertically downwardly from said inoperative position to said operative position in response to energization of said power means;
a deburring device fixedly connected to said slide means for movement therewith, said deburring device including a housing fixedly interconnected to said slide means and a circular deburring tool rotatably supported on said housing, said deburring tool when in said operative position being disposed in engagement with the selected surface of said workpiece for permitting removal of burrs therefrom, said deburring tool when in said inoperative position being spaced from and out of engagement with said workpiece; and
means associated with the deburring device for limiting the pressure with which said tool is caused to bear against the selected surface of said workpiece when said deburring device is moved to said operative position by said power means.

14. A device according to claim 13, wherein said deburring device includes a spindle freely rotatably supported within said housing and extending substantially vertically, said spindle having said deburring tool fixedly mounted adjacent the lower end thereof, said spindle being mounted within said housing for limited axial movement relative to said housing, spring means coacting between said housing and said spindle for normally resiliently urging said spindle and said deburring tool downwardly into its lowermost extended position relative to said housing, and stop means coacting between said spindle and said housing for defining said lowermost position of said spindle.

15. A device according to claim 14, further including adjustable connecting means interconnected between said slide means and the housing of said deburring device for permitting the position of said deburring device to be angularly adjusted relative to said slide means about an axis substantially transverse to the longitudinal axis of said spindle.

16. The combination according to claim 7, wherein said gear supporting apparatus is mounted for rotation about a substantially vertical axis, and said extending support means includes substantially upright post means disposed adjacent the periphery of said gear supporting apparatus and having said head means mounted adjacent the upper end of said post means;

said power drive means comprising a fluid pressure cylinder interconnected between said slide means and said head means for permitting substantially vertical reciprocating movement of said deburring means, said fluid pressure cylinder causing said slide means and said deburring means to be linearly movable between an upper inoperative position and a lower operative position wherein the deburring tool is adapted to be disposed in engagement with a gear located at said one working station; and control means coacting between said deburring device and said gear supporting apparatus for preventing rotation of said gear supporting apparatus after energization of said fluid pressure cylinder for causing downward movement of said tool toward said gear located at said one working station, said control means including switch means coacting between said head means and said deburring means, said switch means being actuated when said deburring means is moved downwardly away from said upper inoperative position.

17. The combination according to claim 16, wherein the deburring tool and the spindle on which it is secured are both mounted for free rotation relative to said housing and are free of interconnection to any driving device, whereby the gear supporting device located at said one working station is rotatably driven after said deburring tool has been disposed in engagement with said gear for causing rotation of said gear to thus permit said deburring tool to rotatably contact a selected angular surface of said gear.

18. The combination according to claim 7, wherein said deburring device also includes brush means rotatably supported thereon closely adjacent said deburring means and positioned for engagement with the gear located in said one working station.

* * * * *